United States Patent
Iossifidis

(10) Patent No.: US 10,240,647 B2
(45) Date of Patent: Mar. 26, 2019

(54) ADJUSTABLE FRICTION BRAKE

(71) Applicant: B/E AEROSPACE, INC., Wellington, FL (US)

(72) Inventor: John Iossifidis, Miami, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/405,891

(22) Filed: Jan. 13, 2017

(65) Prior Publication Data

US 2017/0321769 A1 Nov. 9, 2017

Related U.S. Application Data

(60) Provisional application No. 62/278,199, filed on Jan. 13, 2016.

(51) Int. Cl.
| | |
|---|---|
| *F16D 49/10* | (2006.01) |
| *F16D 63/00* | (2006.01) |
| *F16D 121/14* | (2012.01) |
| *F16D 125/22* | (2012.01) |

(52) U.S. Cl.
CPC ......... *F16D 49/10* (2013.01); *F16D 63/008* (2013.01); *F16D 2121/14* (2013.01); *F16D 2125/22* (2013.01)

(58) Field of Classification Search
CPC .... F16D 49/10; F16D 63/008; F16D 2125/22; F16D 2121/14
USPC ................ 188/67, 265; 384/537, 538, 540
See application file for complete search history.

(56) References Cited

U.S. PATENT DOCUMENTS

| | | | | |
|---|---|---|---|---|
| 2,071,637 A | * | 2/1937 | Laurent | E21B 19/10 188/67 |
| 2,744,436 A | * | 5/1956 | Ross | B23B 47/28 188/67 |
| 4,893,810 A | * | 1/1990 | Lee | A63B 21/0728 24/115 L |
| 5,141,355 A | * | 8/1992 | Stillwagon | E05B 63/121 403/322.2 |
| 6,007,268 A | * | 12/1999 | Whittington | A63B 21/0728 403/110 |
| 6,499,568 B1 | * | 12/2002 | Nemeth | B23Q 1/28 188/265 |
| 8,616,343 B2 | * | 12/2013 | Wako | F16B 2/16 188/265 |

\* cited by examiner

*Primary Examiner* — Pamela Rodriguez
(74) *Attorney, Agent, or Firm* — Angel N. Gerdzhikov; Donna P. Suchy; Daniel M. Barbieri

(57) ABSTRACT

An adjustable friction brake assembly may adjust a variable amount of frictional force required to translate or rotate a shaft, rather than merely locking or unlocking the shaft. The brake assembly includes a housing for internally receiving the shaft, the external portion of the housing including external threading leading into circumferentially spaced fingers extending axially and oriented radially inward to engage the shaft. The brake assembly includes a rotatable adjuster having an internally threaded throughbore for engaging the housing and directing the fingers radially inward to engage the shaft, thereby increasing the required frictional force. For example, by rotating the adjuster clockwise, the required force can be increased; similarly, by rotating the adjuster counterclockwise, the required force can be decreased.

6 Claims, 4 Drawing Sheets

ADJUSTABLE FRICTION BRAKE

RELATED APPLICATIONS

This application is related to and claims priority from U.S. Provisional Patent Application No. 62/278,199 entitled "Adjustable Friction Brake" and filed Jan. 13, 2016, the contents of which are hereby incorporated by reference in its entirety.

TECHNICAL FIELD AND BACKGROUND OF THE INVENTION

The present invention relates generally to a friction brake for applying a braking force to a translatable and/or rotatable shaft, and more particularly, to an adjustable brake assembly including a housing having a through-bore for receiving a shaft, a plurality of resilient fingers radially arranged around the shaft, and an adjuster that turns relative to the housing to adjust the force of the fingers on the shaft.

In certain applications it may be necessary to adjust the position of a translatable and/or rotatable shaft. On an airliner, for example, adjustable shafts may be associated with passenger seats, tray table, partitions, etc. Conventional mechanisms for adjusting shaft position and length typically include locks configured only discrete lock and unlock positions, and not with the ability to adjust the amount or force required to translate and/or rotate the shaft. As such, what is needed is a brake assembly that allows the ability to adjust the amount of force required to translate and/or rotate a shaft.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, provided are embodiments of adjustable friction brake assemblies that provide adjustability in the amount of force required to translate and/or rotate a shaft. The assemblies described herein are adjustable to compensate for variability in design. Adjustability can be achieved, for example, by turning an adjuster in one direction (i.e., clockwise) to increase the force required to translate and/or rotate a shaft, or in the opposite direction (i.e., counterclockwise) to decrease the force required to translate and/or rotate the shaft.

Figure 1:
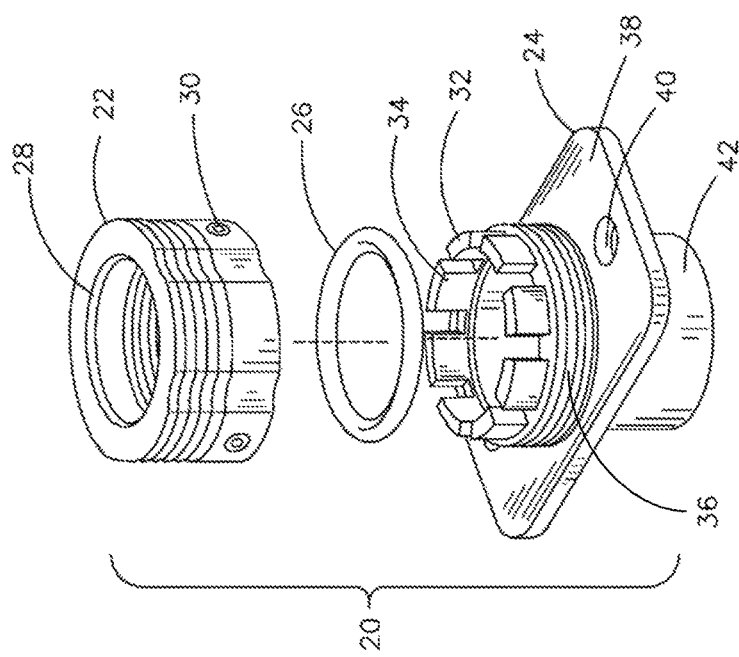
FIG. 1 is an exploded view of an adjustable friction brake assembly according to an embodiment of the invention.

FIG. 1 shows an adjustable friction brake assembly 20 according to a first embodiment of the invention. Friction brake 20 is shown in a disassembled state and generally includes a rotatable adjuster 22, housing 24, and O-ring 26 for being captured between the adjuster 22 and the housing 24. The adjuster 22 can take the form of a nut and generally includes an internally-threaded through bore 28 for receiving the shaft while threadably engaging a portion of the housing 24. The adjuster 22 can optionally include one or more screw bores 30 through the sidewall thereof, oriented axially perpendicular to the through bore 28, for receiving screws or like fasteners for locking rotation of the adjuster relative to the housing 24 and/or shaft.

The housing 24 generally includes a plate 38 circumferentially-surrounding a cylindrical housing portion 42. The housing portion 42 extends in opposite directions away from the opposing major faces of the plate 38. The plate 38 can include one or more screw holes 40 therethrough for receiving fasteners for securing the housing 24 to a support member including, but not limited to, a seat part, furniture, decking, frame member, etc. As seen in FIG. 1, the "lower" part of housing portion 42 is cylindrical and has a continuous sidewall, while the "upper" part includes external screw threading 36 leading into a plurality of circumferentially spaced-apart fingers 32.

The fingers 32 extend in the axial direction and are arranged to substantially circumferentially surround and engage the shaft when the adjuster 22 is "tightened". Each finger 32 terminates at the free end thereof in a flange 34 oriented radially inward. Each finger 32 can be resilient and biased radially outward such that each finger can be urged inward as the adjuster 22 is advanced along the housing and returns to its unforced starting orientation when out of contact with the adjuster 22. While the housing 24 as shown includes eight fingers, the housing portion 42 can be sectioned into a different number of fingers such as two, four, six, twelve, etc. Although not shown, screw bores can be provided through the sidewall of the externally-threaded portion of the housing portion 42 such that the screw bores of the adjuster 22 and housing portion 42 align to receive a fastener through both components to prevent rotation of the adjuster 22 relative to the housing 24.

Figure 3:
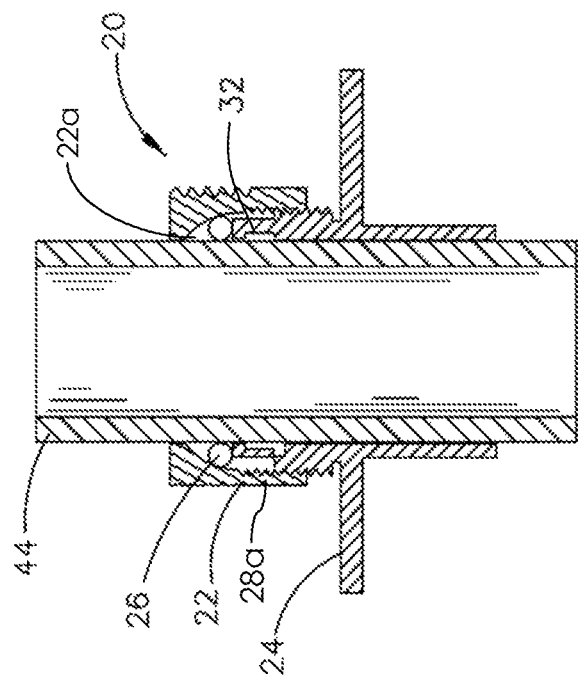
FIG. 3 is a sectional view through the assembly of FIG. 2 taken along line 3-3.
Figure 2:
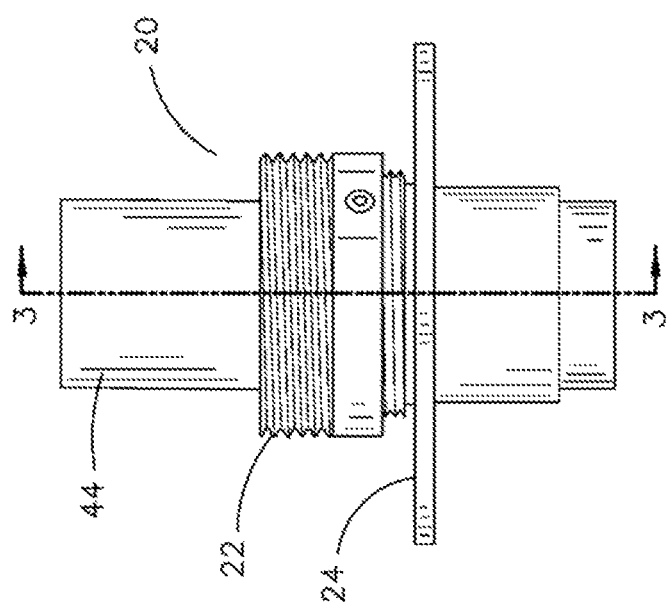
FIG. 2 is a side elevation view of the friction brake shown in an assembled state.
Figure 4:
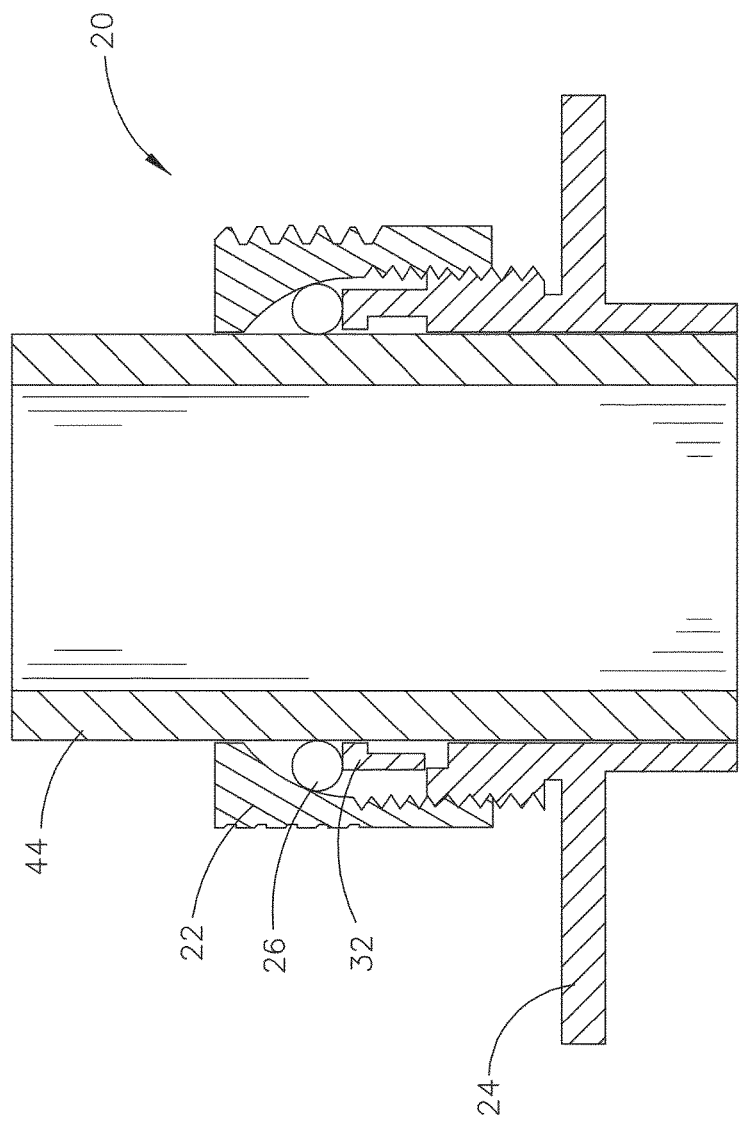
FIG. 4 is a detailed sectional view of the assembly of FIG. 2.

FIGS. 2-4 show the friction brake assembly 20 in an assembled state with a shaft 44 received through the bores of the adjuster 22 and the housing 24. As shown, the O-ring 26 is captured between the ends of the fingers 32 and inner wall of the adjuster 22. The inner wall of the adjuster 22 as shown includes internal threading 28a leading into a ramped surface 22a that tapers radially inward in the direction of one end of the adjuster 22. As the adjuster 22 is advanced relative to the housing 24, for example by turning the adjuster 22 clockwise and keeping the housing 24 fixed, the ramped surface 22a on the inner wall of the adjuster 22 contacts the O-ring 26 to urge the O-ring 26 in the direction of the ends of the fingers 32. Continued advancement of the adjuster 22 compresses the O-ring 26 and urges the fingers 32 radially inward. The compressed O-ring 26 forms a seal between the outer wall of the shaft 44 and inner wall of the adjuster 22, thereby preventing contaminants from reaching the fingers 32. When the adjuster 22 is withdrawn or unscrewed, for example by turning the adjuster 22 counterclockwise while keeping the housing 24 fixed, the O-ring 26 moves out of contact with the ends of the fingers 32 and/or out of contact with the inner wall of the adjuster 22, thereby releasing the fingers 32 and allowing them to return to their starting orientation.

The adjuster 22 can be turned relative to the fixed housing 24 to "tighten" or "loosen" the fingers 32 to adjust the amount of frictional engagement with the shaft 44. For example, the adjuster 22 can be fully tightened such that the shaft 44 is prevented from translating and/or rotating entirely relative to the housing 24, loosened such that there is no frictional engagement between the fingers 32 and the shaft 44, or any degree therebetween. Thus, the friction brake assembly 20 allows for adjustment of the force required to translate and/or rotate the shaft 44.

Figure 6:
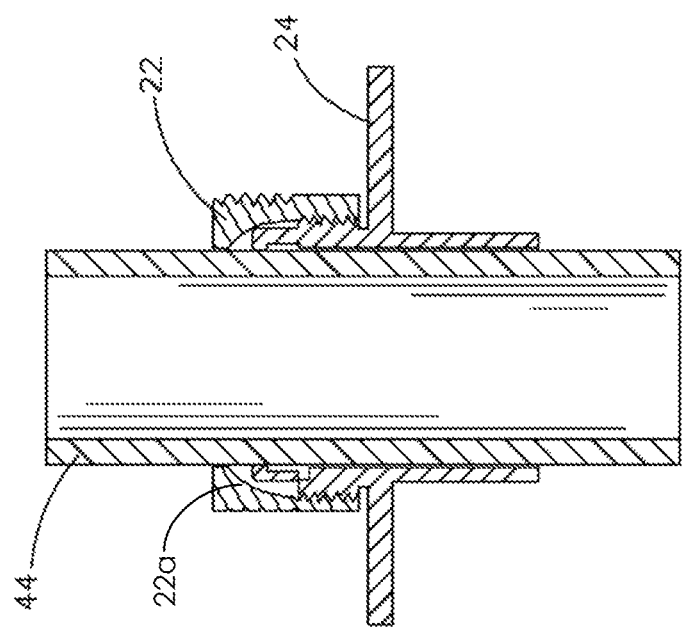
FIG. 6 is a sectional view through an embodiment of a friction brake assembly lacking an O-ring.
Figure 5:
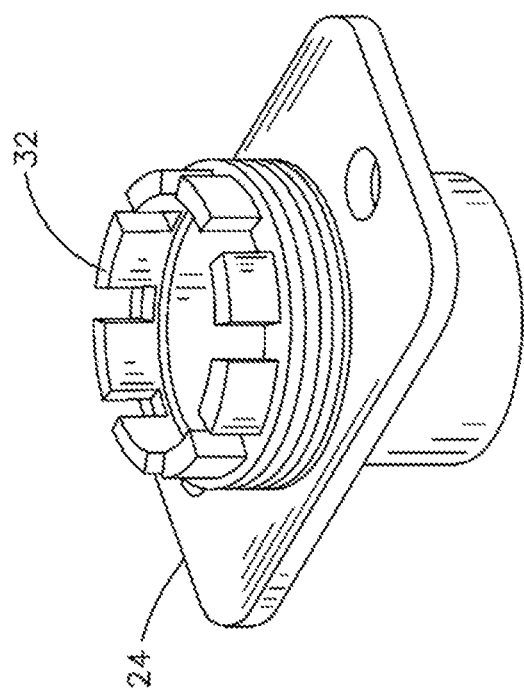
FIG. 5 is an isometric view of the housing of the friction brake assembly.

FIG. 5 is an isometric view of housing 34 suitable for use in the first embodiment described above and in the second embodiment of the friction brake assembly shown in FIG. 6. The friction brake assembly shown in FIG. 6 is the same as the assembly shown in FIGS. 1-4, with the exception of the O-ring. The assembly shown in FIG. 6 lacks an O-ring, and therefore in this assembly the brake is "tightened" by advancing the adjuster 22 along the housing 24 such that the inner ramped or tapered wall 22a of the adjuster 22 urges the fingers 32 radially inward to apply a friction force on the shaft 44 to control or prevent the shaft 44 from translating and/or rotating relative to the housing 24. As used herein, "tighten" or "tightened" can mean increasing frictional resistance on the shaft 44, while the term "loosen" or "loosened" can mean relaxing frictional resistance on the shaft 44.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An adjustable friction brake assembly for applying a friction force to a translatable and/or rotatable shaft received through the adjustable friction brake assembly, comprising:
   a housing having a through-bore for receiving the shaft, one end of the housing terminating in a plurality of axially extending fingers arranged around the shaft in a spaced apart relationship;
   and
   an adjuster threadably engaging the housing, wherein the adjuster is turned in a first direction to urge the plurality of axially extending fingers radially inward to increase frictional force on the shaft, and turned in a second direction opposite the first direction to decrease the frictional force of the plurality of axially extending fingers on the shaft.

2. An adjustable friction brake assembly for adjusting a variable frictional force required to translate or rotate a translatable/rotatable shaft, comprising:
   a housing comprising:
      a first internal throughbore capable of receiving the translatable/rotatable shaft;
      a first external portion including external threading, the first external portion leading into a second external portion including a plurality of circumferentially spaced fingers extending axially and terminating in a flange, the flange oriented radially inward toward the translatable/rotatable shaft, the plurality of circumferentially spaced fingers configured to engage the translatable/rotatable shaft;
   and
   a rotatable adjuster including a second internal throughbore, the second internal throughbore internally threaded and capable of receiving the translatable/rotatable shaft, the rotatable adjuster configured for:
      threadably and rotatably engaging the housing in a first direction to increase the frictional force by directing the plurality of circumferentially spaced fingers radially inward;
      and
      threadably and rotatably engaging the housing in a second direction opposite the first direction to decrease the frictional force.

3. The adjustable friction brake assembly of claim 2, wherein the first direction and the second direction include at least one of a clockwise direction and a counterclockwise direction.

4. The adjustable friction brake assembly of claim 2, further comprising:
   at least one annular gasket fashioned from a compressible material, the annular gasket configured:
      to be captured between the housing and the rotatable adjuster;
      to be directed by the rotatable adjuster to direct the plurality of circumferentially spaced fingers radially inward;
      and
      to form a seal between the shaft and the second internal portion.

5. The adjustable friction brake assembly of claim 2, wherein the first external portion includes at least one first bore capable of aligning with a second bore associated with the housing, the first bore and the second bore together configured to receive at least one first fastener configured to prevent rotation of the rotatable adjuster relative to the housing.

6. The adjustable friction brake assembly of claim 2, wherein the housing further comprises:
   at least one plate circumferentially surrounding the first external portion, the at least one plate including at least one third bore capable of receiving a second fastener configured to secure the housing to at least one support member.

* * * * *